June 8, 1948.  C. A. NORGREN  2,442,777

LUBRICANT INJECTING MEANS

Filed June 1, 1942

CARL A. NORGREN
INVENTOR.

BY *A. A. McGrew*
ATTORNEY

Patented June 8, 1948

2,442,777

UNITED STATES PATENT OFFICE 2,442,777

LUBRICANT INJECTING MEANS

Carl A. Norgren, Denver, Colo.

Application June 1, 1942, Serial No. 445,283

11 Claims. (Cl. 184—55)

This invention relates to a method and means of automatically controlling gas-lubricant intermixture in pneumatic lubricator systems, or the like. More specifically, the present invention relates to improvements in devices of the type disclosed in my prior United States Patents Nos. 1,782,741 and 2,223,700, and in the co-pending application of Carl A. Norgren and P. G. Palmgren, Serial No. 397,266, filed June 9, 1941, for Lubricators, now Patent No. 2,308,773.

Lubricators of this general type utilize a Venturi principle to induce the intake of lubricant into a gaseous body traveling at relatively high velocity through a conduit or other enclosed passage. Subsequently, this lubricant-containing stream is distributed to the wearing parts of bearings, tools, and air cylinders to deposit the lubricant thereon and thus permit it to perform its lubricating function.

In such systems, the gas, usually compressed air, is caused to travel at high velocity through the conductive system, and at different periods in the operation, substantial variations in velocity of the gas will occur. In the devices of the prior art, including those specifically mentioned herein, control of the lubricant-gas intermixture has been dependent upon various manual regulations of the rate of delivery of the lubricant to the zone of Venturi action.

However, none of these controls are designed to regulate the Venturi action in any way and consequently do not provide an instantaneous automatic adjustment to vary the lubricant supply in predetermined proportion to the velocity of the gas at the point of lubricant introduction.

It is an object of the present invention to provide a simple and efficient method of controlling lubricant-gas intermixture in lubricating systems, which automatically and instantaneously changes lubricant supply in predetermined proportion to velocity changes in the gas passing the point of lubricant introduction.

Another object of the invention is to prevent introduction of excessive quantities of lubricant into a lubricating system by providing a method of varying the Venturi action utilized as a lubricant-injection medium and thereby accommodating substantial pressure changes in the stream of gas passing the point of lubricant introduction.

A further object of the invention is to provide a simple, durable and efficient means for controlling lubricant introduction into pneumatic tools or the like.

Other objects reside in the provision of novel combinations and arrangements of parts and novel steps and treatments and will be fully described in the course of the following description.

To afford a better understanding of the invention, reference will be made to the accompanying drawings. In the drawings in the several views of which like characters of reference designate corresponding parts, Figure 1 is a side elevation, partially broken away to disclose details of the application of an embodiment of the invention to a pneumatic lubricator;

Figure 1:
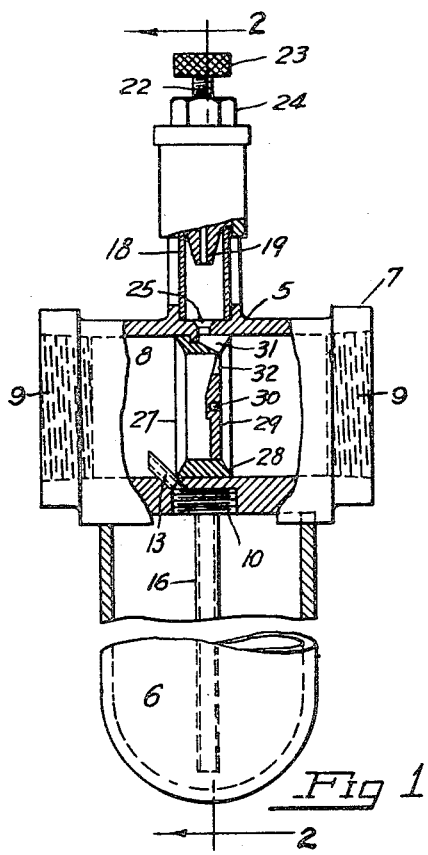
Figure 2:
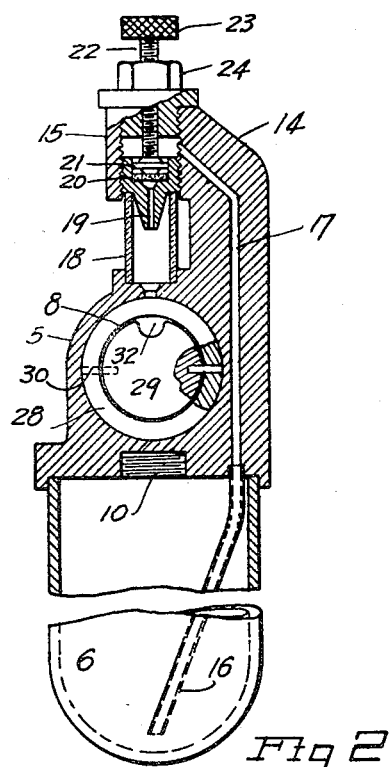
Figure 2 is a fragmentary section taken along the line 2—2, Figure 1.

The lubricator designated generally by the reference numeral 5 has a depending bowl 6 preferably formed from suitable transparent material, which bowl is held on a body portion 7. The body 7 contains a passageway 8 through which a stream of compressed air or the like is directed and at each end the passageway has suitable attachment means, here shown as threaded bores 9 adapted to hold connecting portions of an air line (not shown).

Figure 3:
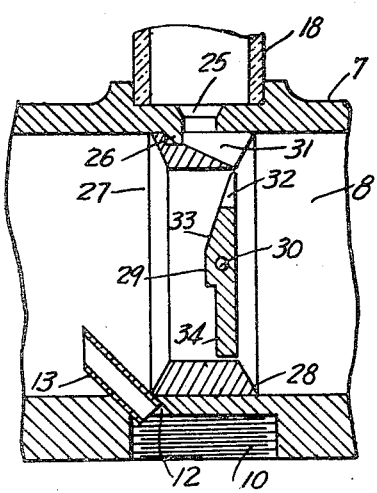
Figure 3 is a fragmentary section, drawn to an enlarged scale, of the control valve assembly illustrated in Figure 1 and showing one operative position of the valve.
Figure 4:
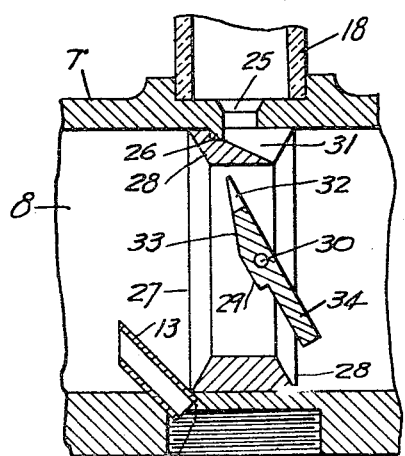
Figure 4 is a view corresponding to Figure 3 and showing another operative position of the valve.

A threaded opening 10 in body portion 7 permits attachment of a valve unit (not shown) by which pressure in bowl 6 is regulated and an inclined passage 12 opens into opening 10. A tube 13 having its intake in passage 8 is fitted in passage 12 as shown in Figures 3 and 4 and admits air into opening 10 from whence it exerts the line pressure on the contents of bowl 6, subject to the regulation of the aforementioned valve.

An upwardly ranging extension 14 of body portion 7 provides a housing for a chamber 15 which is supplied with lubricant from bowl 6 by means of a siphon tube 16 in the bowl and a passage 17 in the extension 14 arranged in conductive relation. Chamber 15 communicates with a sight tube 18 through a drip nozzle 19, containing some form of flow regulation means, here shown as a porous body 20, above which is a disk 21 having a projecting surface bearing against the porous body 20.

A regulating set screw 22 extends into housing 14 and engages the upper surface of disk 21 to urge the same against porous body 20, and the portion of set screw 22 extending outside the housing carries a knurled head 23 to facilitate its movement to different selective positions. A packing nut 24 prevents leakage of lubricant along set screw 22.

A restricted opening 25 extends from the base of sight tube 18 into passage 8 and oil descending from supply chamber 15 through porous body 20, thus passes through sight tube 18 and into the opening 25 which functions as an oil inlet for passage 8.

In preferred practice, this inlet is a part of a Venturi organization in passage 8, and to this end a shoulder 26 is provided in the top wall of passageway 8 to provide an abutment for a valve-member 27.

This valve-member 27 comprises an annular body section 28 carrying a flap 29 on pins 30 held in opposed walls of the annular section 28 on the outlet side thereof. At its top, the annular section 28 is recessed as indicated at 31 in Figures 3 and 4 and the edge of the recessed portion provides the abutment previously described, by which means proper assembly of valve member 27 may be effected with a minimum of effort and error.

The flap 29 is normally positioned relative to opening 25 and recess 31 in a substantially vertical or upright position across and immediately adjacent the outlet of the section 28 as shown in Figures 1 and 3, and at its top has a slot or opening 32, preferably sharp edged and of arcuate shape, which provides an air passage in proximity to recess 31. There is sufficient clearance, as shown, between the flap and the annular section 28 to permit free swinging of the flap.

As a result of the narrowing of passage 8 occasioned by insertion of valve-member 27, and the subsequent enlargement of the passage beyond opening 25, the desired Venturi action is attained. Under conditions of normal flow in passage 8 the flap 29 will remain in its upright position and the flow of gas past the flap will be directed almost exclusively through opening 32.

However, for example, when there is a pronounced demand for a greater volume of gas to operate the apparatus supplied through the passage 8, the pressure on the outlet side of the section 28 falls and thereby increases the pressure difference between the two sides of the flap 29. The increased pressure difference tends to increase the velocity of the gas flowing through the opening 32, but since the area of the lower half of the flap normal to the direction of flow in the passage is greater than that of the upper half, the flap will tend to rotate in a counter-clockwise direction. If the increased volume demand produces a sufficiently great pressure head the flap will rotate so that a passage is opened between the bottom of the flap and the edge of the section 28; thereafter the major forces on the flap are due to velocity head rather than pressure head. This opening is formed without any appreciable change in the cross-sectional area of the opening at the top of the flap including the opening 32. In this connection it will be noted from the drawing that the size of the opening at the top of the flap cannot become greater until the sharp upper edge of the flap has rotated to a position as far on the upstream side of the pins 30 as its normal position on the downstream side of the pins; on the other hand the lower edge of the flap is almost directly below the pins and the area of the lower half is reduced almost from the first movement. It is thus evident that the opening provided at the bottom of the flap 29 constitutes a by-pass to provide for the additional volume of gas flow without requiring additional flow through the opening 32; so that a proportional increase in velocity through the opening 32 is not required. Even when the flap rotates sufficiently to increase the cross sectional area of the upper opening this increase is relatively small because the inner bore of the section 28 extends a considerable distance along the inlet side of the valve. The flap 29 will rotate until the opening formed is of sufficient area to pass the additional volume of gas and will then remain in a stable position until another change of volume is required.

It will be understood, of course, that the action described above, which is brought about by a change in pressure difference, will take place regardless of the cause of the change. Compensation will thus be provided for changes in pressure of the gas source or supply as well as for changes in the volume of gas required at the outlet of the system.

Because substantial pressure differentials may be encountered in passage 8, it is necessary to provide some restriction on the angular movement of flap 29 and thus prevent any tendency toward spinning on pins 30 or other unbalancing movement.

Accordingly in order to provide further stability of the operation of the flap 29 to control the gas flow, the flap is constructed with a surface contour such that it minimizes any tendency to spin or over-correct upon sudden pressure changes. The portion of the flap above pins 30 and on the upstream side is inclined or tapering as indicated at 33 in Figure 3, while the portion 34 below the pins 30 is slightly narrowed but of uniform section. Likewise, the flap is mounted on pins 30 in slightly unbalanced position, with slightly more than half of the material of the flap below the lengthwise axis of the pins; this provides a gravity bias of the flap to its normal upright position.

When the normal volume of gas is flowing it passes through the orifice 32 at its normal velocity and the normal low pressure head and gravity bias in addition to a resulting low pressure produced by the velocity effect around the outlet of the orifice 32 are sufficient to keep the flap 29 in its normal position.

Thereafter, when the pressure difference increases sufficiently to produce rotation of the flap, the projected area of the upper half of the flap remains substantially constant until the inclined face 33 is normal to the direction of air flow; however, the projected area of the lower half of the flap decreases almost from the first movement of rotation. Furthermore, in this position the normal upper face utilizes the full force, i. e. velocity head, of the air whereas the force on the lower half is decreased because of its component parallel to the face of the flap. If the counterclockwise rotation is continued, the component of the force per unit area tending to cause clockwise rotation of the upper inclined half of the flap remains greater than the component per unit area opposing this force on the lower half until the flap reaches its horizontal position. In the extreme, or horizontal position, there is no force component tending to cause counterclockwise rotation, and only an upward component due to the inclined face 33 remains. It will thus be evident that there are definite forces tending to prevent excess movement or over-correction upon sudden pressure changes; and that any tendency of the momentum of the rotating valve to carry it to or past its horizontal position has been minimized.

Actually the extreme angle reached in normal use will be approximately that shown in Figure 4; this position being determined not only by the forces discussed above but also by the velocity effects causing lowering of the pressures on the outlet side of the flap 29 around its edges and around the opening 32.

In operation, the valve 27 is mounted in passage 8 which is located in the lubricator 5 as previously described. The bowl 6 is filled with lubricant and the set screw 22 is adjusted for delivery of a predetermined quantity of oil to passage 8 calculated with reference to the normal velocity in passage 8.

While this lubricant-delivery control is effective in varying the quantity of oil as the pressure in nozzle 19 is varied, the proper functioning of the control is directly influenced by the Venturi action. Consequently, any pronounced increase in the volume of gas flowing in passage 8, unless otherwise controlled, would tend to draw an excessive quantity of lubricant out of supply chamber 15.

The functioning of valve 27 serves to control the Venturi action by permitting only relatively minor increases in the velocity of the gas passing recess 31, even though there has been a major increase in gas pressure at the forward side of valve 27. The automatic adjustment of the flap 29, to accommodate changes in the pressure differential due to changes in required gas volume is instantaneous and precise, and as a consequence the quantity of lubricant supplied to the system is never in excess of a predetermined proportional volume for whatever gas velocity is employed.

While the structural embodiment hereinbefore described is well suited for attaining the objects of the present invention, it will be apparent that other means may be employed for automatic variation of the Venturi action in predetermined relation to gas pressure differentials inducing such action within the spirit and scope of the invention.

In preferred practice, the predetermined relative proportion of lubricant to gas velocity will involve changes in oil injection in arithmetic progression as the gas velocity changes. In this way the deleterious effects of a geometric progression in conjunction with velocity increases are avoided.

The structure described and illustrated herein is intended to disclose proper practice of the invention, and not as a limitation of the same. Changes and modifications may be availed of within the spirit and scope of the invention as defined in the hereunto appended claims.

What I claim and desire to secure by Letters Patent is:

1. In a lubricator having an air-flow passage and an oil inlet at the top of said passage, the improvement which comprises an annular valve body held against the walls of the air-flow passage in proximity to and ahead of the oil inlet with relation to the air-flow, and a flap normally closing a major portion of the passage and mounted on the annular body for angular movement, there being an opening in the flap adjacent the oil inlet for the escape of air past the inlet.

2. In a lubricator having an air-flow passage and an oil inlet at the top of said passage, the improvement which comprises an annular valve body held against the walls of the air-flow passage in proximity to and ahead of the oil inlet with relation to the air-flow, and a flap normally closing a major portion of the passage and pivotally supported on the annular body for angular movement, there being an opening in the flap adjacent the oil inlet for the escape of air past the inlet.

3. In a lubricator having an air-flow passage and an oil inlet at the top of said passage, the improvement which comprises an annular valve body held against the walls of the air-flow passage in proximity to and ahead of the oil inlet with relation to the air flow, and a flap pivotally supported on the annular body and normally held in an upright position closing a major portion of the passage, the upper forward face of the flap being inclined toward the top of the passage, and there being a slot in the inclined portion adjacent the oil inlet.

4. In a lubricator having an air flow passage and an oil inlet in the upper portion of said passage, means including a normally upright horizontally pivoted flap closing a major portion of said passage in its upright position and providing a restricted opening adjacent the oil inlet for facilitating the discharge of oil into said passage, said passage having an abrupt enlargement therein immediately adjacent the lower edge of said flap whereby the lower edge of said flap upon swinging toward said enlargement upon an increase in the pressure difference across said flap immediately provides a by-pass tending to minimize any change in the rate of flow of gas through said restricted opening.

5. In a lubricator having an air flow passage and an oil inlet in the upper portion of said passage, an annular member mounted in said passage adjacent the oil inlet and providing a reduced cylindrical portion of said passage, a flap mounted for rotation on a horizontal axis transverse to said passage and adjacent the outlet end of said reduced portion, said flap being biased to an upright position closing the major portion of said passage and having an opening therein adjacent the oil inlet, said flap having a greater area below said axis whereby upon an increase in pressure difference between the two sides of said flap the lower portion thereof moves away from said annular member to provide an immediate opening into the passage and affording a by-pass for the flow of additional air through said passage for minimizing any change in the rate of flow through said opening.

6. In a lubricator having an air flow passage and an oil inlet in the upper portion of said passage, means including a normally upright flap closing a major portion of said passage and providing a restricted opening adjacent the oil inlet for facilitating the discharge of oil into said passage, said flap being pivotally mounted for rotation about a horizontal axis, the relative areas of the upper and lower halves of said flap being such that upon an increase in the air pressure difference across said flap the lower half thereof moves in the direction of flow of air to provide a by-pass around said restricted opening, the upper edge of said flap in its normal position lying on the downstream side of said axis whereby the projected area of the upper half of said flap increases upon initial rotation thereof, and the lower edge of said flap being located with respect to said horizontal axis so that the projected area of the lower half decreases while the projected area of the upper half is increasing.

7. In a lubricator having an air flow passage and an oil inlet in the upper portion of said passage, means including a normally upright flap closing a major portion of said passage and providing a restricted opening adjacent the oil inlet for facilitating the discharge of oil into said passage, said flap being pivotally mounted for rotation about a horizontal axis transverse to said passage, the projected area of said flap normal to the direction of flow being greater below said axis than above whereby upon an increased pressure upstream the lower portion of said flap rotates in the downstream direction the upper edge of said flap in its normal upright position lying adjacent the walls of said passage on the downstream side of said axis and the lower edge of said flap lying adjacent the wall of said passage substantially directly below said axis, whereby upon rotation due to increased pressure a by-pass is opened below said flap whereas said restricted opening is substantially unchanged.

8. In a lubricator having an air flow passage and an oil inlet in the upper portion of said passage, means including a normally upright flap closing a major portion of said passage and providing a restricted opening adjacent the oil inlet for facilitating the discharge of oil into said passage, said flap being pivotally mounted for rotation about a horizontal axis transverse to said passage, the projected area of said flap below said axis being greater than that above whereby the lower half of said flap rotates in the downstream direction upon an increased pressure difference, the upper half of the face of said flap on the upstream side thereof being inclined and the lower half thereof being substantially upright, said passage having an enlargement adjacent the lower downstream edge of said flap in its normal position whereby a by-pass is provided abruptly upon rotation of said flap and the flow of air through said opening remains relatively constant, said upper half of said face moving toward a vertical position upon the initial rotation of said flap from its normal position and affording increasing resistance to rotation.

9. In a lubricator having an air flow passage and an oil inlet in the upper portion of said passage, means including a normally upright flap closing a major portion of said passage and providing a restricted opening adjacent the oil inlet for facilitating the discharge of oil into said passage, said flap being pivotally mounted for rotation about a horizontal axis and having a greater projected area below said axis than above whereby it is automatically rotated upon an increased flow of air to move the lower edge away from the wall of said passage and provide a by-pass for limiting the increase of flow through said opening, the upper half of said flap having its upstream face inclined upwardly in the downstream direction whereby upon rotation of said flap to its horizontal position the velocity head of air flowing in said passage provides a positive restoring force for preventing the rotation of said flap beyond its horizontal position.

10. In a lubricating apparatus for pneumatic systems including means providing an air passage, a source of lubricant, a flap valve rotatably mounted in said passage for controlling the flow of air therethrough, means providing a restricted opening in said passage for providing air pressure to produce a flow of lubricant from said source and for injecting lubricant into said passage, means for rotating said flap valve upon an increased demand for air flow to increase the effective area of said passage, means effective upon initial movement of said valve for providing abruptly a substantial by-pass for the flow of air around said restricted opening tending to minimize any change in the rate of flow of air through said restricted opening, and means dependent upon an increase in the velocity head of the air flowing through said passage for retarding the rotation of said valve upon a demand for increased flow of air.

11. A lubricator comprising in combination, a body having an air passage, means for connecting each end of said passage in a pneumatic line, an oil conduit terminating at the top of said passage in an oil inlet and communicating with a source of oil, means controlling the flow of oil through said conduit from the source, a flap valve pivotally mounted on a horizontal axis and normally extending transversely of said passage adjacent said inlet, said flap having a restricted opening therein adjacent said inlet for directing air past said inlet to induce a flow of oil into said passage, and said flap having a greater area below said axis than above whereby said flap is rotated upon an increased pressure difference thereacross, said passage having an abruptly enlarged portion adjacent the lower edge of said flap in its normal position whereby upon initial movement of said flap upon an increased pressure difference an immediate by-pass is provided which tends to minimize the change in the rate of flow of air through said restricted opening.

CARL A. NORGREN.

REFERENCES CITED

The following references are of record in the file of this patent:

UNITED STATES PATENTS

| Number | Name | Date |
|---|---|---|
| 1,122,109 | Hansen | Dec. 22, 1914 |
| 1,318,646 | Clark | Oct. 14, 1919 |
| 1,366,831 | Pierce | Jan. 25, 1921 |
| 1,381,680 | Waite | June 14, 1921 |
| 1,529,931 | Smith | Mar. 17, 1925 |
| 1,600,262 | Wickham | Sept. 21, 1926 |
| 1,874,233 | Boulade | Aug. 30, 1932 |
| 1,907,045 | Curtis | May 2, 1933 |
| 2,031,368 | Hodson | Feb. 18, 1936 |
| 2,187,241 | Kehle | Jan. 16, 1940 |
| 2,223,700 | Norgren | Dec. 3, 1940 |
| 2,245,600 | Medsker | June 17, 1941 |
| 2,245,601 | Medsker | June 17, 1941 |

FOREIGN PATENTS

| Number | Country | Date |
|---|---|---|
| 314,989 | Great Britain | Sept. 29, 1930 |